Patented Jan. 12, 1932

1,840,452

UNITED STATES PATENT OFFICE

WILLIAM E. JONES, OF MILWAUKEE, WISCONSIN, ASSIGNOR TO EAGLE CHEMICAL COMPANY, OF MILWAUKEE, WISCONSIN, A CORPORATION OF WISCONSIN

CLEANING AND DISINFECTING COMPOUND

No Drawing.   Application filed April 23, 1927.   Serial No. 186,176.

This invention relates to a cleaning and disinfecting compound especially designed for household purposes although also adapted for universal application.

The object of the invention is to provide a compound of this character which is substantially inert at atmospheric dryness but which when mixed or dissolved in water becomes a potent cleansing and disinfecting agent and acts not only to remove dirt, scum and other deposits or discolorations from bath-room fixtures and the like, but also serves to destroy bad or foul odors as well as bacteria. The compound may therefore be packaged and shipped and left standing indefinitely without hazard or inconvenience of any kind as it remains for all practical purposes entirely inactive unless mixed or dissolved in a bulk of water.

The compound may consist of a dry mixture of common salt, bisulphate of soda or nitre cake, any oxidizing agent of which potassium permanganate, potassium chlorate, potassium nitrate, or sodium nitrate may serve as examples, and a substance such as corn starch, which tends to prevent lumping or consolidation.

In preparing a compound so constituted, the ingredients are preferably mixed in about the following proportions:

Common salt (NaCl) _____ 48½ lbs.
Commercial nitre cake (NaHSO$_4$) _ 48½ lbs.
Potassium permanganate
  (KMnO$_4$) _____ 1 lb.
Corn starch _____ 2 lbs.

The several ingredients are thoroughly mixed dry and then packaged in cartons or the like at atmospheric dryness and shipped in such form to the trade. As long as the compound remains dry there is little or substantially no reaction between the several ingredients and the compound remains entirely inert and can be handled and shipped and left standing indefinitely without hazard or inconvenience of any kind. If any reaction occurs it is very slight and does not extend beyond the exposed surface of the mixture and manifests itself merely by a faint odor of chlorine at the exposed surface which is not easily detected.

The compound finds advantageous use in connection with closet bowls, traps or the like. By merely sprinkling the compound freely into the bowl or trap and thereby dissolving it in the water always contained therein the ingredients are caused to react to produce a small amount of chlorine which dissolves in the water as it is formed. After permitting the water with the compound therein to stand for a short time the bowl or trap is flushed and all dirt, scum, incrustations, deposits and discolorations previously on the bowl or trap will have disappeared. Moreover, bad odors and bacteria will be destroyed and this effective action will extend on down through the plumbing system. The compound will not injure the bowl, trap or plumbing system.

To a large extent the advantages and effectiveness of the compound result from the formation of hydrochloric acid and the liberation of a small amount of chlorine when the compound is thoroughly mixed in the water, the chlorine being taken up by the water in which the compound is dissolved and exercising its cleansing, disinfecting and bleaching functions without escaping to the atmosphere. But the compound as a whole possesses peculiarly desirable cleansing and disinfecting properties.

The chlorine liberated is in a practical sense controlled for, as it is taken up by the water, it does not escape to the air. By utilizing a small quantity of the oxidizing agent the amount of chlorine liberated is increased but still remains within the capacity of the water to absorb. However, even in the absence of the potassium permanganate or other equivalent ingredient, enough chlorine is produced to render the compound effective for many if not all purposes, the acid sodium sulphate acting in a sufficiently concentrated solution as an oxidizing agent to produce a small amount of chlorine.

When the potassium permanganate or equivalent is omitted, then the ingredients used are preferably mixed in about the following proportions:

Commercial nitre cake _____ 49 lbs.
Common salt _____ 49 lbs.
Corn starch _____ 2 lbs.

Thus, irrespective of whether the potassium permanganate or equivalent oxidizing ingredient is used or not, the compound, when in solution, first produces hydrochloric acid as a result of the reaction of the sodium sulphate of the nitre cake with the sodium chloride and then liberates the chlorine from the hydrochloric acid as a result of the oxidation of the hydrogen thereof, the oxidation of the hydrogen occurring either by virtue of the action of the special oxidizing agent when one is employed or by virtue of the action of the acid sodium sulphate in the highly concentrated solution.

In other words, in the solution, the formation of the chlorine is based upon oxidation of the hydrogen of the hydrochloric acid whereby water is formed and chlorine liberated.

Thus, in the solution when using an oxidizing agent such as potassium nitrate the reaction progresses as follows:

$$NaCl + NaHSO_4 \rightleftarrows Na_2SO_4 + HCl$$
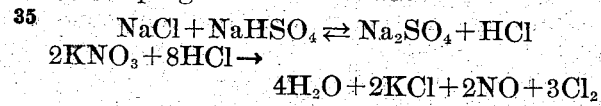
$$2KNO_3 + 8HCl \rightarrow 4H_2O + 2KCl + 2NO + 3Cl_2$$

Preferably an oxidizing agent is used which does not absorb moisture from the atmosphere. Potassium nitrate is such a substance.

It is to be understood that the proportions of the ingredients may be varied considerably and good results produced. In particular, it has been found that the amount of salt utilized may vary within a wide range. From 30% to 50% of salt has been utilized and the amount of nitre cake employed varied correspondingly. Indeed, the results may be more or less approximated by even more widely varying the proportions of salt and nitre cake.

As pointed out, the chlorine liberated is taken up by the water and does not escape to the air but if desired the chlorine can be driven out into the air by heating a solution containing the compound. Of course, the quantity of chlorine produced may be increased as desired by increasing the percentage of the oxidizing agent.

The invention claimed is:

1. A cleaning and disinfecting substance substantially inert at atmospheric dryness and effective when mixed with water, and consisting of a dry mixture of common salt (48½ parts), bisulphate of soda (48½ parts), an oxidizing agent (1 part), and a substance tending to prevent lumping or consolidation (2 parts) prior to the mixture of the compound with water.

2. A cleaning and disinfecting substance substantially inert at atmospheric dryness and effective when mixed with water, and consisting of a dry mixture of common salt (48½ parts), bisulphate of soda, (48½ parts), and potassium nitrate (1 part).

In witness whereof, I hereto affix my signature.

WILLIAM E. JONES.